US006879579B1

(12) United States Patent
Myles et al.

(10) Patent No.: US 6,879,579 B1
(45) Date of Patent: Apr. 12, 2005

(54) MEDIUM ACCESS CONTROL PROTOCOL FOR DATA COMMUNICATIONS

(75) Inventors: Andrew Frederick Myles, North Ryde (AU); David James Skellern, Roseville (AU); John Fraser Deane, Eastwood (AU); Terence Michael Paul Percival, Lane Cove (AU); Sihui Zhou, Ryde (AU); Alex Chun Kit Lam, Pymble (AU)

(73) Assignee: Commonwealth Scientific and Industrial Research Organisation (AU)

( * ) Notice: Subject to any disclaimer, the term of this patent is extended or adjusted under 35 U.S.C. 154(b) by 0 days.

(21) Appl. No.: 09/508,758

(22) PCT Filed: Sep. 18, 1998

(86) PCT No.: PCT/AU98/00785

§ 371 (c)(1),
(2), (4) Date: May 30, 2000

(87) PCT Pub. No.: WO99/16214

PCT Pub. Date: Apr. 1, 1999

(30) Foreign Application Priority Data

Sep. 19, 1997 (AU) .............................................. PO9322

(51) Int. Cl.$^7$ .............................................. H04B 7/212
(52) U.S. Cl. ...................................................... 370/348
(58) Field of Search ................................ 370/442–447, 370/458–462, 478–480, 340, 345, 347–349, 329, 337; 455/450–455, 507–511

(56) References Cited

U.S. PATENT DOCUMENTS

| 4,763,325 A | 8/1988 | Wolfe et al. |
| 4,970,720 A | 11/1990 | Esaki |

| 5,093,924 A | * | 3/1992 | Toshiyuki et al. | .......... 455/450 |

(Continued)

FOREIGN PATENT DOCUMENTS

| EP | 653865 | 5/1995 |
| WO | WO 96/31077 | 11/1996 |
| WO | WO 97/24008 A1 | 7/1997 |

OTHER PUBLICATIONS

Jeong, Dong Geun, Design and Performance Evaluation of a New Medium Access Control Protocol for Local Wireless Data Communications, IEEE/ACM Transactions on Networking, Dec. 1995, vol. 3, No. 6.

(Continued)

*Primary Examiner*—Chi Pham
*Assistant Examiner*—Thai Hoang
(74) *Attorney, Agent, or Firm*—Wood, Phillips, Katz, Clark & Mortimer

(57) ABSTRACT

A method for controlling communication between a hub and a plurality of distributed stations over a medium is disclosed. The method comprising the steps of a method for controlling communications access between a hub (8) and a plurality of distributed stations (M1–M7) over a medium, the method comprising the steps of (a) allocating a plurality of channels for data communications between the station (M1–M7) and the hub (8), the number of channels being at least equal to the number of stations, (M1–M7) and each station owning at cast one channel, each channel being varyingly in one of an empty-, a reserved, or an owner-state, and whereby (i) the empty-state provides a channel to which any station (M1–M7) can have access; (ii) the reserved-state provides a channel to which a station (M1–M7) having made a reservation with the hub (8), but not owning the channel, can have access; and (iii) the owner-state provides a channel to which only the owning station (M1–M7) has access; and (b) allocating the respective state and/or the number of channels over time an the basis of each station's data requirements.

81 Claims, 11 Drawing Sheets

U.S. PATENT DOCUMENTS

| | | | |
|---|---|---|---|
| 5,280,630 A | * | 1/1994 | Wang ........................ 455/452.2 |
| 5,355,374 A | | 10/1994 | Hester et al. |
| 5,384,777 A | | 1/1995 | Ahmadi et al. |
| 5,390,366 A | * | 2/1995 | Kasugai ....................... 455/524 |
| 5,436,902 A | | 7/1995 | McNamara et al. |
| 5,504,939 A | * | 4/1996 | Mayrand et al. ............ 455/450 |
| 5,574,977 A | * | 11/1996 | Joseph et al. ................ 455/450 |
| 6,061,340 A | * | 5/2000 | Albrow et al. ............... 370/337 |
| 6,363,267 B1 | * | 3/2002 | Lindskog et al. ........... 455/574 |
| 6,650,630 B1 | * | 11/2003 | Haartsen ..................... 370/345 |
| 6,658,010 B1 | * | 12/2003 | Enns et al. .................. 370/401 |

OTHER PUBLICATIONS

Part II: Wireless LAN Medium Access Control (MAC) and Physical Layer (PHY) specifications, IEEE Standard 802.11–1997, Approved Jun. 26, 1997, The Institute of Electrical and Electronics Engineers, Inc., New York, USA—Cover and table of contents (14 pages) and pages 1 through 151 extracted from complete standard.

* cited by examiner

HUB DATA UNIT

MOBILE DATA UNIT

MEDIUM ACCESS CONTROL PROTOCOL FOR DATA COMMUNICATIONS

FIELD OF THE INVENTION

This invention relates to the field of data communications, and to methods and apparatus to implement a Medium Access Control (MAC) protocol therefor. The invention has particular (but not exclusive) application in wireless communications environments such as $\mu$-wave, mm-wave or infra-red. The term "data communications" is to be understood in its broadest sense to include data per se, and forms such as voice and video.

BACKGROUND OF THE INVENTION

For discussion purposes, reference will be made to wireless MAC protocols, however it should be understood that the invention is equally applicable to cabled (ie. wire and optical fibre) and wireless data communications alike.

A protocol generally is a set of agreed conventions (methodology) for handling the exchange of information between communication processing "elements".

In a wireless medium, the capacity to accommodate multiple users seeking access to the medium must take into account fundamental limitations of bandwidth. For any wireless data communications system there is a finite data carrying capacity, and this capacity must be shared between users on an appropriate basis to satisfy the user's requirements. A number of MAC protocols have been devised for this purpose. Such protocols variously attempt to satisfy the objective of providing users with access to the full medium during times of low load demand, and fair access to the medium during times of high load demand. Furthermore, it may be desirable to guarantee a user the ability to transmit or receive a burst of data on demand regardless of other user load demands.

Usually, users requesting access to a wireless medium will require low reception delays and high throughput. Where wireless data communication services are supplied on a subscription basis, the subscribing users negotiate certain guaranteed performance requirements that have to be met in order for the service provider to retain that subscriber's loyalty.

Known protocols fall broadly within four classes: fixed access, random access, guaranteed access, and hybrid protocols.

The fixed access category includes those MAC protocols where each station is allocated a fixed proportion of the available bandwidth. This category includes time division multiple access (TDMA), frequency division multiple access (FDMA) and code division multiple access (CDMA) protocols. The main problem with fixed access protocols is that they are not flexible enough to efficiently meet the dynamic bandwidth requirements of a local area network (LAN) environment. Additionally, such a protocol could not be operated as the sole access method, as the bandwidth allocation must be established Initially, and reestablished when mobile stations move between wireless areas.

A random access protocol is only statistical in its nature and therefore its performance is never guaranteed. There are many examples of random access protocols including those based on ALOHA, Carrier Sense Multiple Access (CSMA) and collision resolution. Random access protocols can generally be characterised by the following properties. At low aggregate loads a random access protocol usually provides low delay. At high loads, contention will limit throughput and increase delay. Scheduling of transmission by a random access protocol also is difficult due to the lack of guarantees about access to the wireless medium. Similarly, prioritised access to the wireless medium cannot be ensured. ALOHA protocols also tend to ignore collisions, whereas CSMA protocols tend to try and avoid collisions or limit the length of collisions.

Guaranteed Access Protocols, as the name suggests, guarantee access to the medium, and may be achieved using either distributed or centralised control mechanisms. Examples of guaranteed access protocols include polling protocols, token passing protocols and some collision resolution protocols.

Most practical, implementable wireless MAC protocols are designed as a hybrid of two or more protocols from the previously described categories. This allows a wireless MAC protocol to be tailored more easily to provide a range of services given a particular set of wireless physical layer properties. Hybrid protocols are mostly based on the idea of contention on the wireless medium followed by a reservation that holds the wireless medium for a single station without contention.

R-ALOHA is a hybrid protocol that includes elements of random access protocols and guaranteed access protocols. R-ALOHA is based on slotted ALOHA with regular allocation of slots. If a station is successful in transferring a data unit in a slot then it may reserve the same slot in subsequent frames. Reserved access to future slots reduces contention, thus increasing throughput and reducing delay. R-ALOHA has two unsatisfactory aspects. Firstly, it only allows a station to reserve one slot per frame which is too inflexible in a LAN environment. Secondly, a station may keep a slot reserved without restriction, which may result in unfairness and long delays.

A variation of R-ALOHA, Packet Reservation Multiple Access (PRMA), solves these problems for voice traffic. PRMA supports periodic data units (voice traffic) and random data units (data traffic). Only periodic data units can reserve the same slot in future frames. Random data units always use slotted ALOHA access. Problems similar to those experienced for R-ALOHA are avoided in two ways. Firstly, periodic data units are buffered only for a limited period before they are transmitted or discarded, thus reducing the load during congestion. Secondly, stations must give up reservations between, talk spurts. PRMA is thus very dependent on the properties of speech for effective operation. Another example of this physical layer dependence is that the frame rate in PRMA is tied to the speech rate.

In a published paper entitled "A Dynamic packet-switching system for Satellite Broadcast Channels", (ICC'75, San Francisco, June 1975) the author Binder describes a TDMA based satellite communication scheme where all stations own a channel (or channels) in a frame structure. The frame may have more channels than those owned by stations. All stations receive each transmitted packet via the satellite. Each packet header includes a reservation for the station's queued packets. Stations which do not have a current reservation will have their owned channel used for reservation access. Each station allocates reservation requests on a round-robin basis. A station with new packets to transmit may regain its owned channel by causing a collision. In the next frame all stations will consider the channel reserved by its owner which can then make a reservation request. A master station generates frame markers and transmits the reservation state. This is used by new stations and stations which have lost a packet and hence the reservation sequence.

There is a problem here, however, with packets received with errors. If the packet contained reservations which were processed by other stations, then the receiving station cannot use the reservation scheme for the rest of the frame. This is hard to distinguish from intentional collisions intended to free an owned channel. In addition, a station must receive what it transmits to detect a purposeful collision.

The Motorola ALTAIR™ system uses a reservation protocol with time multiplexed request and data channels in a slotted frame. The start of the frame contains request slots in which user modules (UM) make requests to a central control module (CM) using slotted ALOHA access with an adaptive transmission probability. The end of the frame contains a series of grant slots, which specify the allocation of data slots in the next frame, and a series of management slots. The middle part of the frame contains data slots from the CM to the UMs and allocated data slots from the UMs to the CM. Control information is distributed through blocks at the start and end of a frame with intervening data slots. The mobile station needs to track where it is in this structure and it will lose considerable efficiency if it has a problem receiving a critical block.

An access request is made by competitive ALOHA in the start control block with no feedback until the end of frame control block. Access slots occur in the midst of a potentially long series of user slots. Any failure to track the user slot sequence will affect a station's throughput and the throughput of any other station it collides with. Bandwidth must be consumed to provide guard time between these slots to allow for variation in clock speed between stations.

A more generic reservation protocol than ALTAIR™ was proposed by International Business Machines Corp. for use as the basis of the IEEE 802.11 Standard. It uses a slotted frame with three sections (A, B and C). Each section is preceded by a variable length header containing management information related to the section, including its length. Section A contains the data units from the hub station to the wireless stations, section B contains data units in reserved slots from the wireless stations to the hub station or other wireless stations and section C contains slots used by the wireless stations to send reservations or short data units using a random access protocol. Requests may be for either asynchronous or isochronous bandwidth.

The IBM protocol (disclosed in U.S. Pat. No. 5,384,777, Ahmadi et al, entitled "Adaptive Medium Access Control Scheme for Wireless LAN") recognises the importance of power conservation by specifying that all necessary control information is carried in the header at the start of each section. The header indicates when data units will be sent to a wireless station in section A and when the wireless station has slots allocated in section B. The wireless station may power-down at other times and during section C if it does not need to send any data units. However, this functionality requires real time interpretation of complex variable length headers, making the IBM protocol an unlikely candidate for high speed operation. Problems in common with the ALTAIR™ system also equally apply.

Recently, the IEEE 802.11 Working Group selected a MAC protocol, Distributed Foundation Wireless MAC (DFWMAC), that will form the basis of all future work. DFWMAC is a very complex protocol with a number of optional facilities that are supposed to allow it to operate with a range of physical layer properties. It also has nodes of operation that allow it to operate with and without the coordination provided by a hub station.

DFWMAC's fundamental mode of operation is known as a distributed coordination function. It uses a CSMA/CA protocol where a mobile station ensures that the channel is clear for a minimum period before transmission. Priority is implemented by ensuring that the sensing occurs for a minimum period depending on the priority level of the data unit. Thus, DFWMAC assumes that the physical layer supports carrier sensing. To avoid the 'hidden terminal problem', a mobile station may optionally also use an RTS/CTS type protocol similar to MA/CA to ensure that long data units do not collide with each other. To ensure error free operation, data units are immediately acknowledged at high priority. A disadvantage of carrier sensing is the significant time spent listening to determine that the wireless medium is free. Then the radio unit must be switched from receive to transmit, which takes further significant time.

DFWMAC also includes a second mode of operation, known as a point coordination function, which effectively provides a synchronous data unit service. In this mode, a central hub station divides the bandwidth into a frame consisting of a contention free period and a contention period. During the contention free period, a hub station polls mobile stations on a poling list. The hub station starts a contention free period by sending the first poll at a high priority. The reservation mechanism is entirely unsophisticated: 'send a message during the contention period'. There are no methods to respond to bursty traffic or to attempt to make efficient use of the medium.

U.S. Pat. No. 4,970,720, Hiroshi Esaki assigned to Toshiba K K, entitled "A Packet Communication Exchanging Apparatus" describes an even simpler CSMA/CA scheme for wired and wireless LANs. Here a station causes a collision to obtain access to the medium by forcing active stations to delay access attempts.

DISCLOSURE OF THE INVENTION

The present invention is directed to overcoming or at least ameliorating one or more of the disadvantages in the prior art. Embodiments described herein specify a medium access control protocol that provides mechanisms to make efficient use of the available wireless transmission capacity while supporting the operation of synchronous and asynchronous communications, with guaranteed performance according to negotiated parameters, between a mobile station and a hub station.

Therefore, the invention broadly discloses a method for controlling communications access between a hub and a plurality of distributed stations over a medium, the method comprising the steps of:

(a) allocating a plurality of channels for data communications between the stations and the hub, the number of channels being at least equal to the number of stations, and each station owning at least one channel, each channel being varyingly in one of an empty-, a reserved-, or an owner-state, and whereby:

(i) the empty-state provides a channel to which any station can have access;

(ii) the reserved-state provides a channel to which a station having made a reservation with the hub, but not owning the channel, can have access; and (iii) the owner-state provides a channel to which only the owning station has access: and (b) re-allocating the respective state and/or the number of channels over time on the basis of each station's data requirements.

The invention further discloses a method for controlling communications access between a hub and a plurality of mobile stations via a plurality of channels providing data access therebetween, there being at least as many channels as mobile stations, and the channels being varyingly in one of an empty-, a reserved-, or an owner-state, and whereby:

(i) the empty-state provides a channel to which any station can have access;

(ii) the reserved-state provides a channel to which a station having made a reservation with the hub, but not owning the channel, can have access; and (iii) the owner-state provides a channel to which only the owning station has access;

the method comprising the steps of re-allocating the respective state and/or the number of channels over time on the basis of each station's data requirements.

The invention yet further discloses a communications system having controlled data access to a medium, the system comprising:

a hub having transceiving means for communication via the medium and data processing means;

a plurality of distributed stations, each having transceiving means for communication with the hub via the medium and data processing means;

and wherein said data processing means of the hub and the stations co-operate to allocate a plurality of channels for data communications between the stations and the hub, the number of channels being at least equal to the number of stations, and each station owning at least one channel, each channel being varyingly in one of an empty-, a reserved-, or an owner-state, and wherein:

(i) the empty-state provides a channel to which any station can have access, (ii) the reserved-state provides a channel to which a station having made a reservation with the hub, but not owning the channel, can have access, and (iii) the owner-state provides a channel to which only the owning station has access, and co-operate to re-allocate the respective state and/or the number of channels over time on the basis of each station's data requirements.

The invention yet further discloses a hub for a communications system, operable to have controlled data access to a medium in co-operation with a plurality of distributed stations, the hub comprising:

transceiving means for communications via the medium; and data processing means coupled to the transceiving means;

and wherein said data processing means of the hub is operable to allocate a plurality of channels for data traffic between the stations and the hub, the number of channels being at least equal to the number of stations, each channel being varyingly in one of an empty-, a reserved-, or an owner-state, and wherein:

(i) the empty-state provides a, channel to which any station can have access, (ii) the reserved-state provides a channel to which a station having made a reservation with the hub, but not owning the channel, can have access, and (iii) the owner-state provides a channel to which only the owning station has access, and further operable to re-allocate the respective state and/or the number of channels over time on the basis of each station's data requirements.

The invention yet further discloses a wireless local area network having a medium access protocol to control access, the network comprising:

a hub having transceiving means for communication via free space paths and data processing means;

a plurality of distributed stations, each having transceiving means for communication with the hub via free space paths and data processing means;

and wherein said data processing means of the hub and the stations co-operate to allocate a plurality of channels for data traffic between the stations and the hub, the number of channels being at least equal to the number of stations, and each station owning at least one channel, each channel being varyingly in one of an empty-, a reserved-, or an owner-state, and wherein:

(i) the empty-state provides a channel to which any station can have access, (ii) the reserved-state provides a channel to which a station having made a reservation with the hub, but not owning the channel, can have access, and (iii) the owner-state provides a channel to which only the owning station has access, and co-operate to re-allocate the respective state and/or the number of channels over time on the basis of each station's data requirements.

Embodiments of the invention have the benefit of simultaneously: (a) guaranteeing a minimum access to the network transmission capacity for each mobile station according to negotiated channel parameters, (b) unreserved capacity can be used by other mobile stations, thereby providing such mobile stations with capacity in excess of a guaranteed minimum, and obtained independent of hub control and without requiring additional complexity in the mobile unit, and (c) provides parameters to maximise the probability of successful transmission by one mobile station in situations of competitive access to a slot, including registration slots and empty slots.

One characteristic of the medium access protocol is that it is demand oriented rather than a requesting type known in the prior art.

BRIEF DESCRIPTION OF THE DRAWINGS

Embodiments of the invention now will be described with reference to the accompanying drawings, in which.

DESCRIPTION OF PREFERRED EMBODIMENTS AND BEST MODES

Network Configuration and Elements

Figure 1:
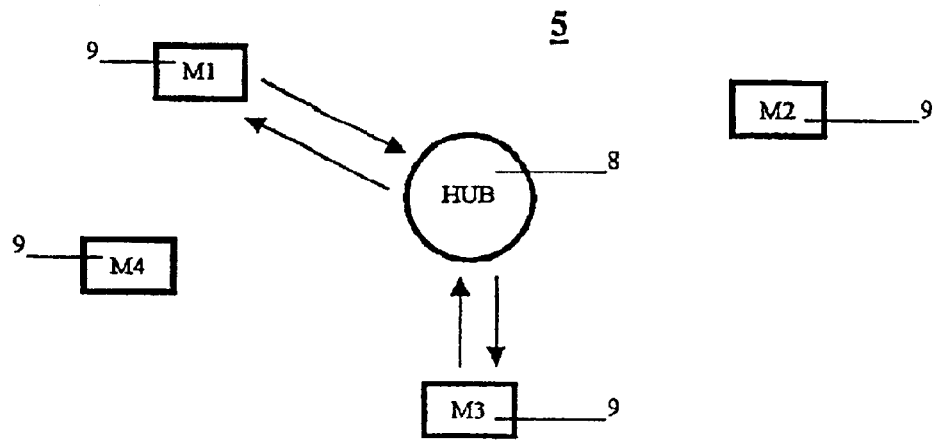
FIG. 1 is a schematic block diagram of a wireless system upon which a MAC protocol embodying the invention can be implemented.

FIG. 1 shows a simplified form of a wireless system 5, in which a single transceiving hub station 8 facilitates data communications between a number of distributed transceiving mobile stations 9. The mobile stations 9 can be mobile within a cell (not shown) controlled by the hub station 8. The hub station 8 acts to coordinate bidirectional data communications between the mobile stations 9, in the example shown, between stations M1 and M3.

Figure 2:
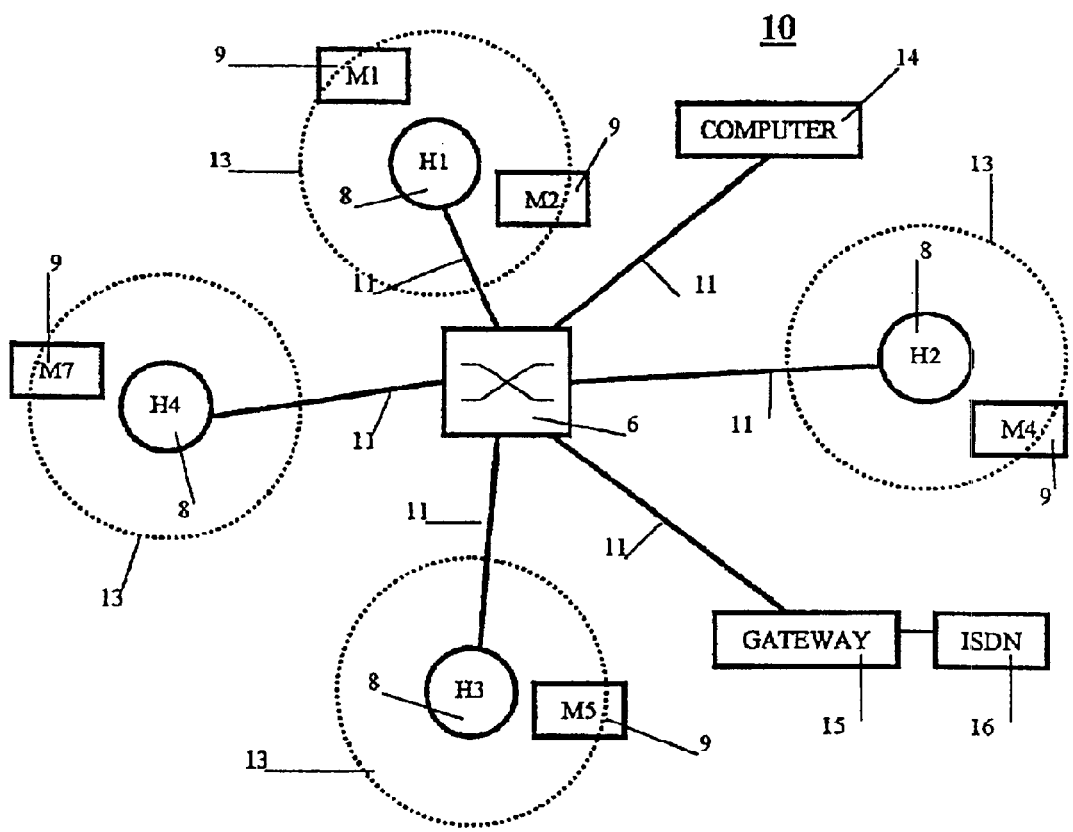
FIG. 2 is a schematic block diagram of a wireless LAN system in another embodiment.

FIG. 2 shows a wireless LAN system 10. Four hub stations (H1–H4) 8 are interconnected via a backbone network, in this case star cabled links 11 connected to a switching unit 6. The star network 11 and switching unit 6 equally can be replaced by another backbone network with different topology, including a ring network, and with different media including wireless. Each hub station 8 has an associated wireless cell 13 within which are located various mobile stations (M1–M7). A computing device 14 also has connection to the network II, as does a gateway 15 providing access to a generic ISDN network 16. Data communications can be between ones of the mobile stations 9, between a mobile station 9 and the computing device 14, or between a mobile station 9 and another device located on the ISDN network 16. Again, the hub stations 8 act to coordinate the flow of data to and from the mobile stations.

Figure 3:
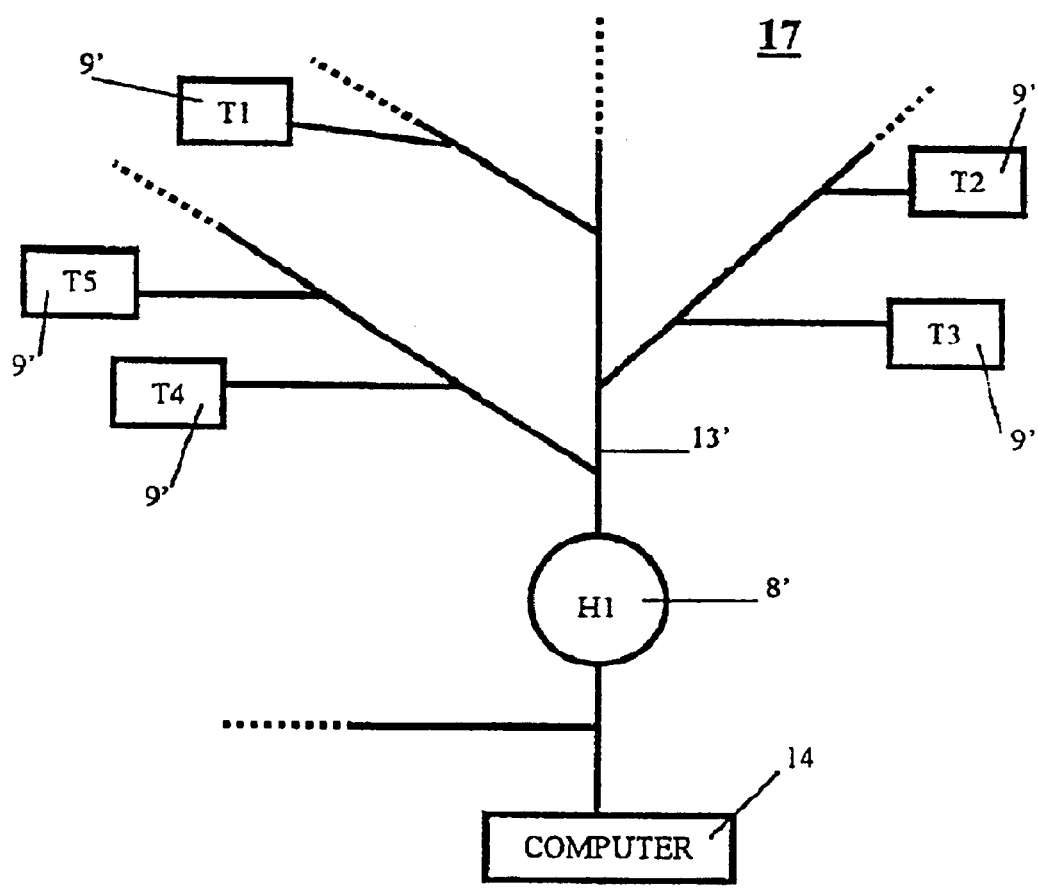
FIG. 3 is a schematic block diagram of a wired network system in a further embodiment.

FIG. 3 shows a block diagram of a wired network system 17, upon which a protocol embodying the invention also can be implemented. As previously noted, the invention is not limited to wireless environments. A number of terminals (T1–T5) 9' are in cabled connection 13' with a hub station (H1). The cabled connection 13' has the characteristic that the hub station H1 communicates with the terminals 9' using broadcast transmissions. The hub station, in turn, can be in cabled connection with a computer 14 and a like hub station (H2) (not shown). The hub station H1 coordinates data communications between the terminals T1–T5 and the computer 14. The arrangement of FIG. 3 is simplified inasmuch as there could be many hub stations and associated terminals, interconnected by a backbone wired or wireless network that provides duplex communication between the hub stations 8'.

In a broad form, it can be considered that a hub station 8 or 8' operates on one set of rules to control access to the medium by a number of stations 9 or 9', or either to each other, or to compatible units accessible via a network 11 attached to the hub station 8 or 8'. The stations 9 or 9' use a different set of rules to respond to the hub station based on their internal states.

Figure 4:
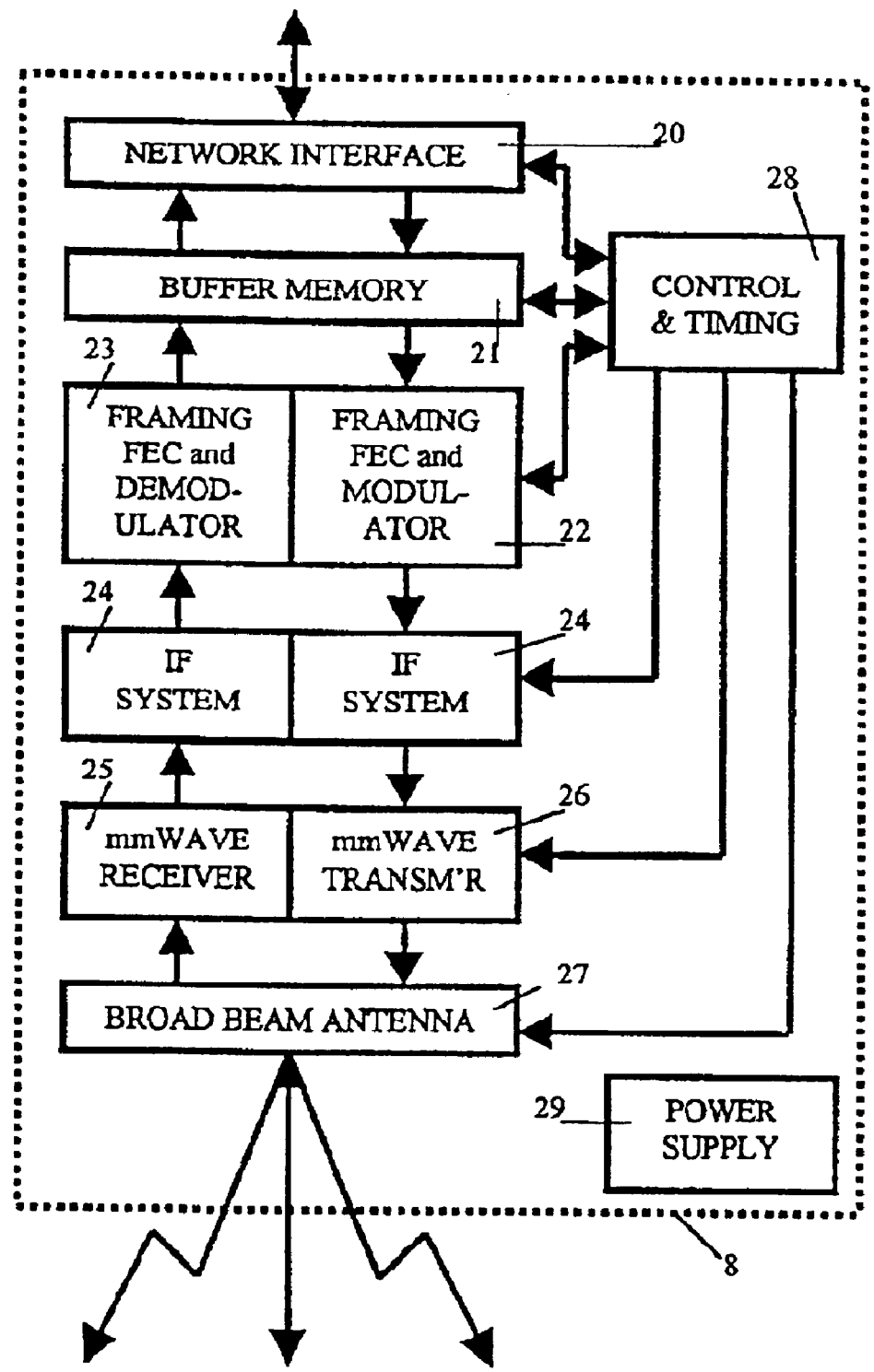
FIG. 4 is a schematic block diagram of a hub station.

As shown in FIG. 4, a number of component blocks for a hub station 8 are provided. These take the form of a network interface 20, a buffer memory 21, a framing, forward error correction (FEC) and modulating section 22, a framing, forward error correction and demodulation section 23, an IF (intermediate frequency) system section 24, a radio receiver 25, a radio transmitter 26, and an antenna 27 which is sufficiently broad in its radiation pattern to illuminate the entire cell 13. The antenna 27 can achieve this result statically or dynamically (with electronic or mechanical beam steering). All these items are connected to, and are operable by, a control and timing section 28. In addition, all are powered by an AC mains or battery operable power supply 29.

Figure 5:
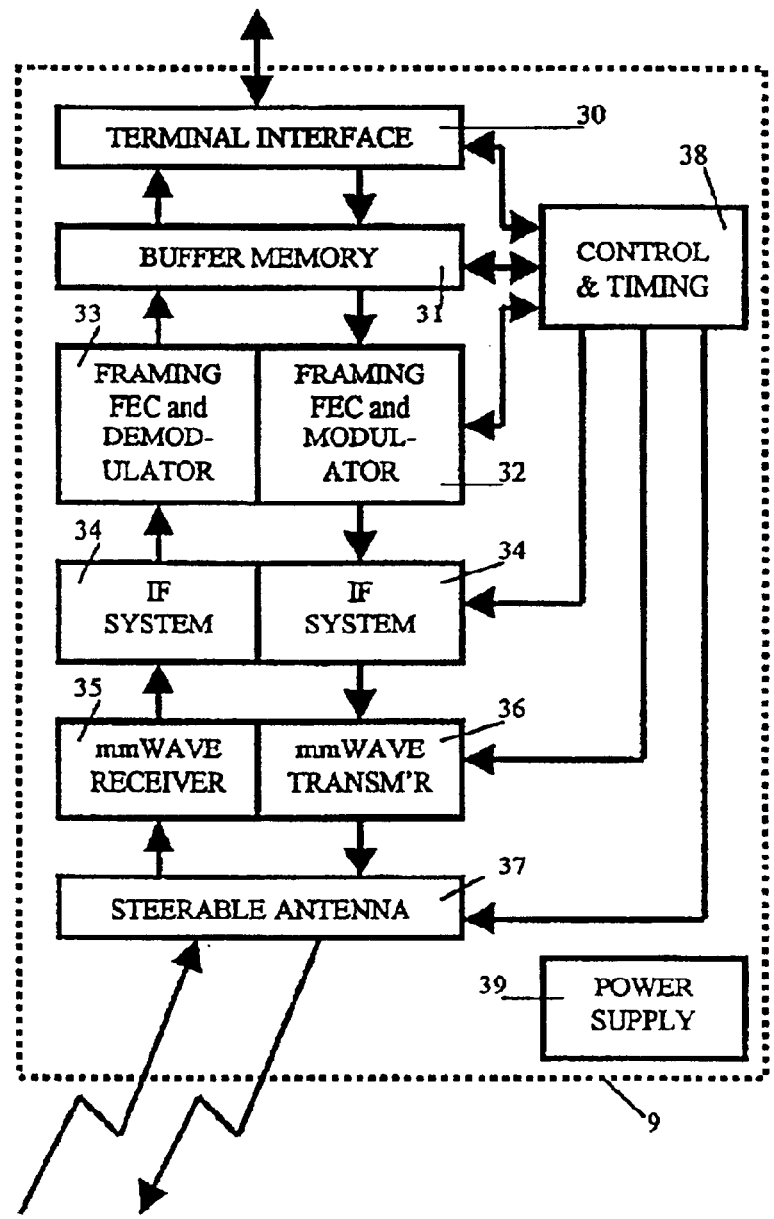
FIG. 5 is a schematic block diagram of a mobile/radio station.

Equivalent portions of the mobile station 9 are indicated by a designator having a magnitude higher by 10 in FIG. 5. The mobile station 9 has a battery-powered power supply 39.

Further details concerning a modulation and demodulation implementation, as a form of ensemble modulation, are disclosed in commonly owned U.S. Pat. No. 5,487,069 (equivalent to Australian Patent No. 666411 and EP-A-0 599 632) entitled "A Wireless LAN", the contents of which are incorporated herein by cross-reference.

It will be noted that the antenna 37 is preferably a steerable antenna which is electronically steerable by the control and timing section 38 to at least partially direct the transmissions to and from the mobile stations 9 towards the corresponding hub station 8. A suitable antenna for this purpose is that disclosed in commonly owned Australian Patent No. 671214 (equivalent to EP-A-0 632 523 and U.S. Pat. No. 5,714,961) entitled "A Steerable Antenna", the contents of which also are hereby incorporated by cross-reference.

Software implementing a MAC protocol embodying the invention resides in the timing and control elements 28,38 of a hub station 8 and mobile station 9 respectively.

A characteristic of the communications medium which is important in the following descriptions is referred to as "capture". This may occur in some embodiments under certain conditions. When multiple mobile stations transmit in the same slot the hub station may receive either:
(a) a garbled data unit which cannot be interpreted; this is called "collision" and no "capture" has occurred, or
(b) a correct data unit where the mobile with the strongest signal has swamped the others; this is "capture".

Data Link Procedures

The description of the data link procedures will proceed with reference to the system shown in either FIGS. 1 or 2, and particularly wireless communications between a hub station 8 and a mobile station 9.

Figure 6:
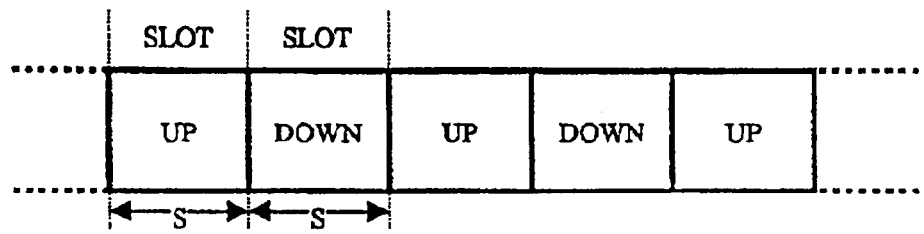
FIGS. 6 to 9 show the structures of transmission in a wireless cell.
Figure 7:
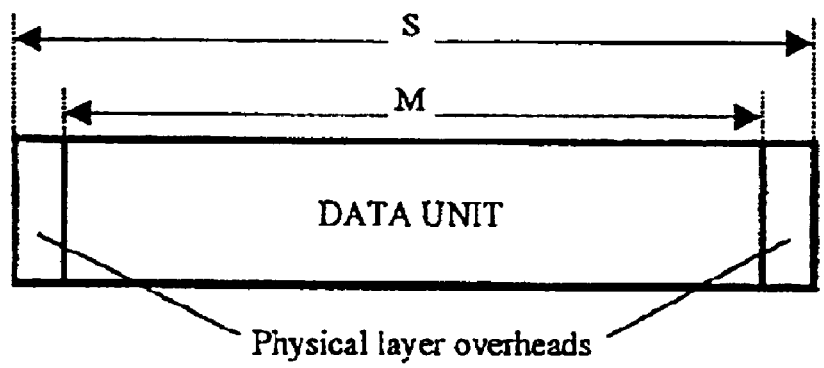

FIG. 6 shows that access to the cell transmission capacity is divided into slots S that alternate between the up-link (mobile to hub) and the down-link (hub to mobile). Each slot carries a data unit M together with physical layer overheads, as shown in FIG. 7.

Slots are organised into channels. A channel is the set of either down-link (hub to mobile) or up-link (mobile to hub) slots, respectively addressed, to or owned by the same mobile station. Each up-link channel, if allocated to a mobile station, is said to be owned by it.

A hub station uses the down-link both to transfer data units to mobiles and to facilitate medium access control operations in the cell. A hub station transmits data units in one of two classes: (i) management traffic, including invitation to register, and (ii) data traffic.

When there are no mobile stations registered, the hub station data units relate principally to registration. Unregistered mobile stations use a modified ALOHA protocol to deliver registration requests to the hub station. These requests include the station's unique MAC address, called the station-id. This is included in the registration confirmation response from the hub station to avoid 'capture' related problems.

When a mobile station registers it obtains the channel identifier of its "owned" channel from the hub station. The hub station allocates a fraction of the available data transfer time to the new mobile and enters it in a scheduling database. The hub station also allocates data unit storage resources for the mobile.

The hub station transmits data units to a specific mobile by setting the station-id of the mobile in the header of the data unit.

The hub station uses a scheduling algorithm to determine which channel will be allocated for a down-link and for the following up-link. Mobiles use a modified R-ALOHA protocol, along with their internal state, to determine use of the up-link.

Each down-link data unit contains an acknowledgment in its header that the hub station sets if it received a data unit correctly in the last up-link slot. This acknowledgment includes the sending station-id to avoid the problem of the capture effect. Mobile stations use the acknowledgment to determine if the data unit they just transmitted was successfully received by the hub station.

A mobile can negotiate for hub station support to achieve battery conservation. In this case, time-critical prompts will be exclusively directed to this mobile which include controls to allow it to ignore, management and data traffic for a period.

Following registration, a mobile station can request that the hub station adjust the parameters controlling its traffic service characteristics.

A wireless medium is subject to unpredictable variations and occasional loss of transmissions. To reduce the impact of any such loss the control elements of the MAC protocol are distributed in time. Instead of channel access information forming a block part of a frame header, it is distributed through the headers of each slot transmitted by the hub station.

Figure 8:
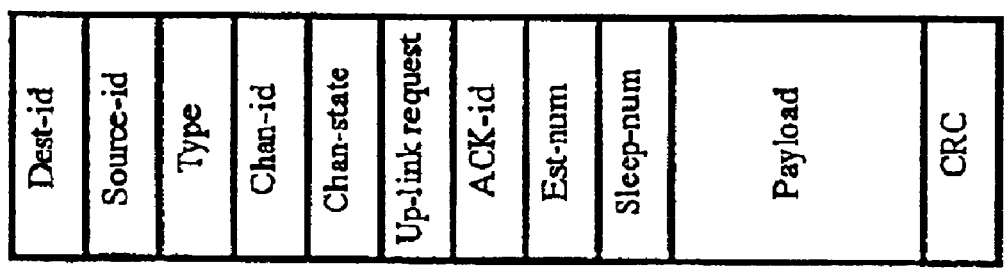
Figure 9:
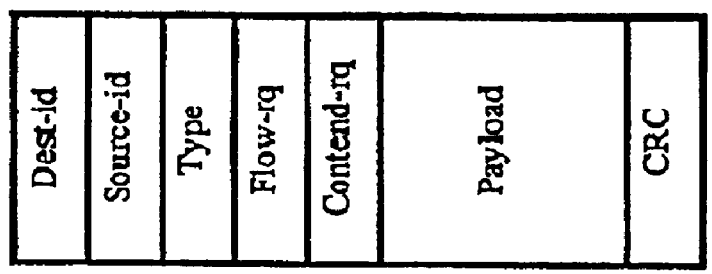

The protocol data units (PDU) are constituted differently for the up-link and down-link. FIG. 8 shows the protocol data unit fields for the down-link, while FIG. 9 shows the protocol data unit fields for the up-link. Tables 1A & 1B describe these fields.

TABLE 1A

Hub station protocol data unit fields

| Field | Description |
|---|---|
| dest-id | Identifier of the destination for the payload |
| source-id | Identifer of the source of the payload. |
| type | An identifier for a down link data unit format, additionally distinguishing between data and management payloads. |
| chan-id | Channel identifier for the following up-link. This is in the range 0 to (max_number_allocated_channels − 1) or registration_chan_id (a known number outside that range) |
| chan-state | The state of the following up-link slot: empty, owner or reserved (Note: the registration channel is always in empty-state) |
| up-link_result | The result of last up-link transmission as ack or nack. |
| ack-id | If up-link_result = ack, ack-id is the identifier of the successful source mobile station else unused. |
| est-num | For the next up-link slot: For registration: estimated number of registering mobile stations For data: estimated number of active mobile stations |
| sleep-num | The duration of sleep following next up-link slot. |
| payload | For a data transmission: fixed length data, eg 4 × 53 bytes. For a management transmission: management data units including beacon, management request and management response. |
| crc | Data unit integrity check. |

TABLE 1B

Mobile station protocol data unit fields

| Field | Description |
|---|---|
| dest-id | Identifier of the destination for the payload |
| source-id | Identifier of the source of the payload. |
| type | An identifier for an up link data unit format, additionally distinguishing between data and management payloads. |
| flow-rq | Flow request for this channel |
| contend-rq | Request to be counted as a mobile station competing for ALOHA slots. |
| payload | For a data channel: fixed length data, eg 4 × 53 bytes For a management transmission: management data units including registration request, management request and management response. |
| crc | Data unit integrity check. |

Hub Station Operation

Figure 10:
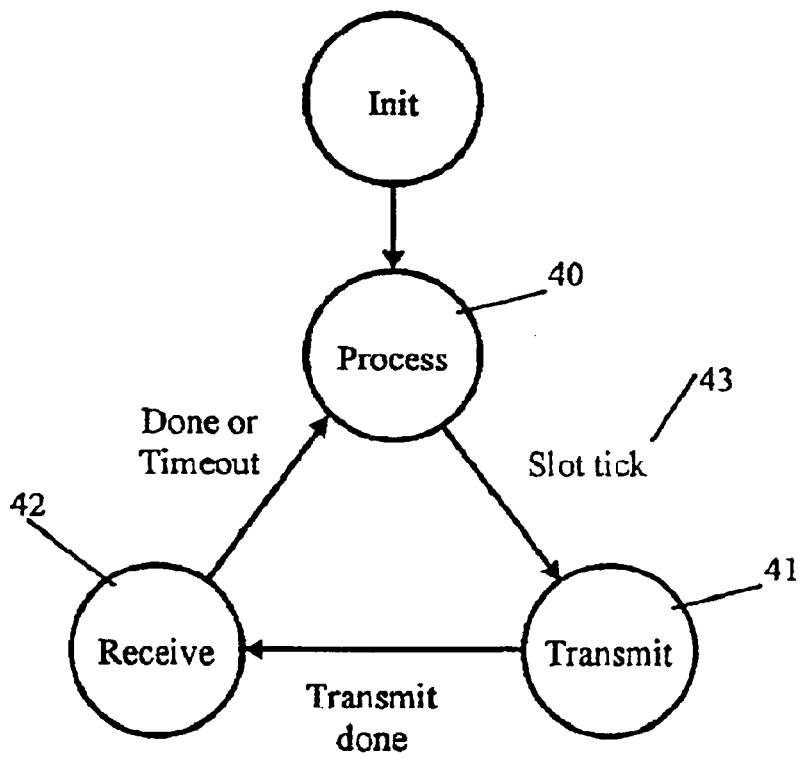
FIG. 10 is a state diagram for timing and scheduling of a hub station.

Operation of the hub station 8 in the wireless cell now will be described with reference to FIG. 10, which is a state machine relating to the timing of the alternating hub-originated and mobile-originated transmission sequence. The process state 40 includes the handling of any received data units from the mobile stations, the processing of acknowledgments, and the generation of the next down link data unit. The transition from the process state 40 to the transmit state 41 is controlled by a slot tick 43 generated by a clock (not shown). Upon completion of a slot transmission, the hub moves to the receive state 42. The hub returns to the process state 40 upon reception of a data unit from a mobile station or after a specified time period.

The transfer of data units out of the wireless cell, ie. to and from a backbone network, may be accomplished asynchronously from the handling of data units to and from the mobiles, and is governed by the protocol on the backbone network.

Hub Cycle

The hub station includes the channel identifier of the next up-link slot in the header part of each down-link slot. Although a channel may be used by any mobile station, priority is given to the mobile station that owns the channel. The sequencing of channels is determined by the 'schedular' process in the hub station taking into account the requirements of each mobile station, including the required service parameters and sleep requirements. Every mobile station registered in a cell is allocated at least one channel. In this way, all mobile stations can be guaranteed some access to the network.

Consecutive up-link and down-link slot pairs are scheduled over a frame. A frame structure is maintained by the hub station and describes the channel sequence for the down-link and the up-link. However, the notion of a frame has no significance outside the hub station, and mobile stations do not need to hold state information about frames. The hub station cycles through the frame structure selecting down-link and up-link channels according to the frame entries.

The information needed to dimension a frame is delivered to the hub station in management requests from the mobiles. The number of slot pairs in a frame is decided dynamically by the hub station, taking into account the number of mobile stations registered in the wireless cell and the type and channel parameters they require. The maximum frame length may be determined by the minimum allowable channel data rate supported by the network. The frame size may change to accommodate mobile station service requirements or changes in the number of mobile stations.

Hub Station Initialisation

The hub station scheduler is initially set for no registered mobiles. In this state, all down-link and up-link slots may be allocated to the management channel, with the intention that they be used for registration.

Hub Registration Process

The registration channel is selected from time to time by the Scheduler. Mobiles use a modified form of slotted-ALOHA to deliver a registration request to the hub station. Failures and successes are used by the hub station to generate an estimate of the number of mobiles attempting to register (see Table 2 below). If the registration succeeds the hub station records the channel identifier for the mobile and informs the Scheduler.

TABLE 2

Hub station registration estimation process

| Registration up-link result | | Change to estimated # of registrants | Next down-link ack/nack |
|---|---|---|---|
| Mobile Tx | Collision | | |
| no | no | 0 (see Note) | nack |
| yes | yes | +2 | nack |
| yes | no | −1 | ack |

Note:
The absence of any activity for a pre-defined long period of time should result in the estimate being set to zero.

The hub station must provide some specific information to the newly registered mobile station. This includes the channel identifier for the first channel to be owned by the mobile station, and other network parameters which will be delivered by management packets.

Hub Channel Operation

The hub station always transmits in down-link slots to mobile stations in a cell. The down-link payload may contain data originating from within the cell, from elsewhere in the network, or from the hub station itself. Fields in the headers of each down-link slot allocate a channel to the next up-link slot and constrain mobile access to that channel.

Each up-link channel is defined to be in one of three states (empty, reserved or owner). The hub station stores the state of each channel and transmits the state of the next channel (along with other control fields) to the mobile stations in the header field of each down-link slot. The three channel states are defined as follows:

Empty-state

If a data channel is in the empty-state, any mobile station with queued data units is allowed to contend for access to it using a slotted ALOHA protocol. Mobile stations may make reservations for the channel in future frames according to a modified R-ALOHA protocol.

Reserved-state

If a channel is in the reserved-state, the mobile station that has reserved the channel may transmit a data unit. However, the owner of the channel may sometimes use it regardless of the mobile station that has reserved the channel.

Owner-state

If a channel is in the owner-state, only the mobile station that owns the channel may use it to transmit a data unit. Channels allocated to a mobile station with negotiated channel parameters are called "provisioned" and remain in the owner-state. Thus the owner of a channel has guaranteed access.

At the end of each up-link slot the hub station changes the channel state according to the State Table shown in Table 3, and selects the next channel according to a scheduling algorithm.

that they will be contending for ALOHA slots. The hub station transmits a mobile'station estimate in a field in the MAC header part of every down-link.

If a mobile station is to be counted by the hub station then it makes a contend-request in the header part of an up-link slot at the same time it attempts to send a data unit.

The hub must exchange management data units with mobile stations for control tasks which may include registration completion (which might involve security), channel parameter negotiation and sleep control. The channel parameter negotiation may alternatively be delivered by standard signaling procedures.

Hub Station Scheduler

The hub station may enter into contracts with mobile stations to provide certain channel parameters in which it will allocate a portion of the available capacity for the use of that mobile station. The protocol described herein supports guaranteed channel parameter contracts. The hub station supports these contracts with a scheduler that is fair and does not degrade the performance of any existing contracts. The acceptance of a contract requires the allocation of hub station resources up to, but not exceeding, the hub station's total (bandwidth) capacity.

Hub Sleep Scheduling

The protocol described herein supports a mode of operation in which the mobile enters a low-power mode that does not require it to listen to every down-link slot. For a mobile indicating a sleep requirement, the slot scheduler can allocate owned slots during the period when the mobile is awake.

TABLE 3

Up-link data channel state transitions

| | Up-link State[4] | | Up-link Result[4] | | | | Next | Send |
|---|---|---|---|---|---|---|---|---|
| Provisioned Channel | Channel State | Mobile is Owner | Mobile Tx | Collision | Flow Request | Update est-num | Channel State | ack/ nack |
| no | empty or reserved[1] | X | yes | yes | X | no | owner | nack |
| no | empty or reserved[2] | no | yes | no | res | yes | reserved | ack |
| no | empty or reserved[2] | yes | yes | no | own | yes | owner | ack |
| no | empty or reserved[3] | X | yes | no | no | yes | empty | ack |
| no | empty or reserved[3] | X | no | no | no | no | empty | nack |
| no | owner | yes | yes | no | own | yes | owner | ack |
| no | " | X | yes | no | no | yes | empty | ack |
| no | " | X | no | X | X | no | empty | nack |
| yes | " | yes | yes | no | X | yes | owner | ack |
| yes | " | yes | yes | yes | X | no | owner | nack |
| yes | " | yes | no | no | X | no | owner | nack |

Where X = don't care.
Note:
[1]Owner pre-emption.
[2]Reservation.
[3]End of flow.
[4]Other states represent protocol error states which may be due to hub station failure, mobile failure or a denial of service attack. The appropriate response may include a hub station restart.

The columns under "Provisioned Channels", "Up-link State" and "Up-link Result" describe the type of the channel, the state of the channel and the result of the latest reception on that channel. The "Update est-num" column indicates whether to use the up-link contend-rq field to update the estimated number of contending mobiles (ie. est-num). In the right hand columns the new state for the channel is given and the "Send ack/nack" column shows what should be sent in the next down-link slot in response to the mobile's data unit.

The hub station is required to acknowledge and to count mobile stations whenever their contend-rq signal indicates Mobile Station Operation A mobile station's operation will be described with reference to FIG. 11.

Mobile cycle

Figure 11A:
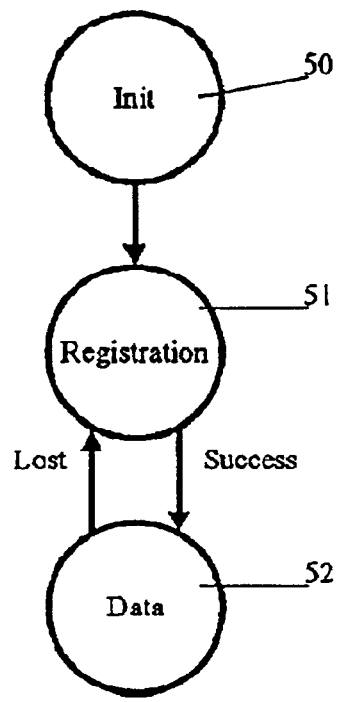
FIGS. 11a–11c show state diagrams for a mobile station.
Figure 11B:
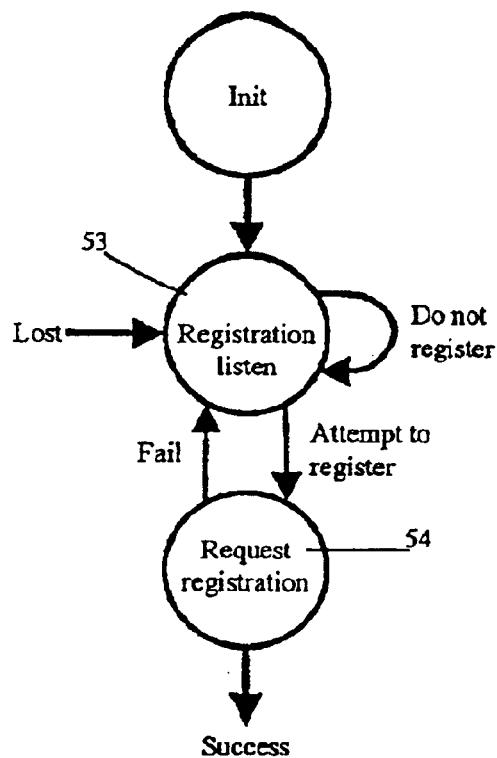

The activity of the mobile station is determined in response to messages received from the hub station. FIG. 11a shows that a mobile station operates in three states 'init' 50, 'registration' 51, and 'data' 52. The state 'registration' 51, entered after initialisation or as a result of losing contact with the hub, is expanded in FIG. 11b. An unregistered mobile station is in the 'registration-listen' state 53 in which it waits for the hub to issue a registration slot. The mobile enters the 'request-registration' state 54 if it attempts to register. The 'data' state 52 is expanded in FIG. 11c. A mobile receives down-link slots from the hub in 'data-receive' state. 55. Down-link data units are processed in state 'data-process' 56. Depending on the outcome of the processing, the mobile either exits the 'data' state 52 or enters one of three states: the 'data-transmit' state 57 in which it transmits a data unit in the next up-link slot; the 'data-sleep' state 58 in which it conserves power; or the 'data-receive' state 55.

Mobile Registration

In the 'registration' state 51 shown in FIG. 11a, the mobile operates in accordance with the Registration State Table shown in Table 4 below. The objective of the procedures described by the Registration State Table is to competitively deliver a message to the hub station. The hub station provides an estimate of the number of mobiles it believes are attempting to register. A mobile uses the inverse of this number to set the probability of transmitting its registration request. This is used to increase the probability of a successful registration transmission by delaying, or spreading in time, registration requests of the contending mobile stations.

In Table 4, 'Channel identifier' is the 'chan-id' field in the previous down-link protocol data unit. 'Mobile Tx probability' is used by the mobile station to set the probability that it will attempt to access the channel. The next two columns describe the result of the mobile access attempt: 'Mobile Tx' states whether or not the mobile did attempt to access the channel, and 'Hub response' is the response by the hub station that appears in the down-link slot immediately following the registration attempt and defines whether the registration attempt has succeeded.

Mobile Channel Parameter Request

The mobile station requests channel characteristics consistent with the hub station's scheduling algorithm. The method of delivery of this request to the hub station depends on the networking environment, but can be accomplished though management processing.

Mobile Data Transmission

Figure 11C:
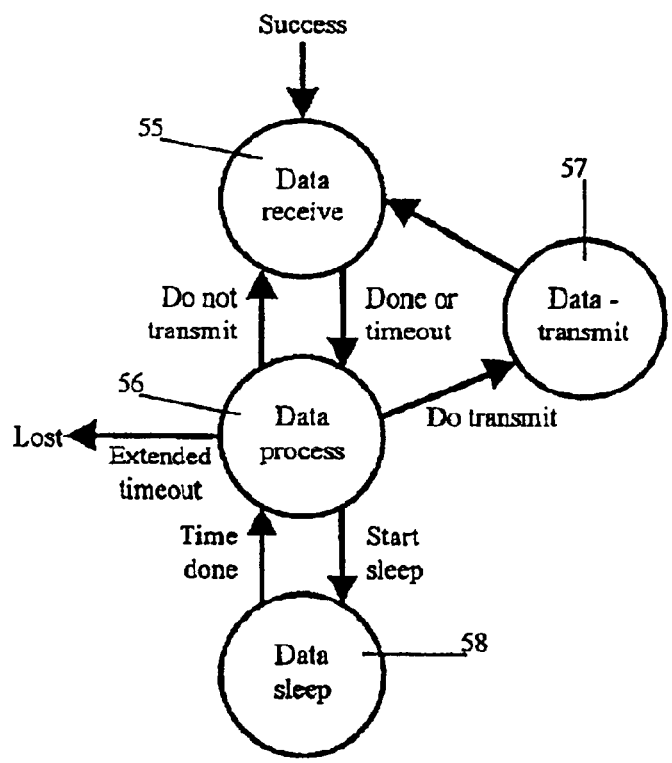

The following section further describes the operations carried out in the 'data' state 52 of FIG. 11a and its expanded form in FIG. 11c.

The header in an up-link data unit may include a flow request (see Table 1B) that is set by a Mobile station to reserve exclusive access to the channel. The logic to allow reservations to be made is given in the State Table of Table 5 below. A successful reservation results in a channel being temporarily re-allocated to the mobile station that made the request. This allows the transmission of data in the channel (called a "flow") until the reservation is relinquished by the mobile station dropping the flow request, or the channel is reclaimed by the owner. Two types of "flow" are recorded: owner-flow and reserve-flow.

TABLE 4

Mobile registration state table

| Channel identifier | Mobile Tx Probability | Mobile Tx | Hub response | Next Mobile State |
|---|---|---|---|---|
| registration_chan_id | 1/(est-num + 1) | yes | nack | registration |
| registration_chan_id | 1/(est-num + 1) | yes | ack | data |
| registration_chan_id | 1/(est-num + 1) | no | X | registration |
| other | 0 | no | X | registration |

TABLE 5

Mobile data state table

| | Current State | | | | | | Transmission | | | Flow Record Update Transmission Result | | | |
|---|---|---|---|---|---|---|---|---|---|---|---|---|---|
| | | | | | | | Decision | | | ACK & ack-id = station-id | ACK & ack-id ≠ station-id | | |
| channel state | mobile has flow in channel | owner | queue length | Flow Request Allowed | Pre-empt Allowed | Release Required | Tx Probability | request flow | increment Flow Counter | | | NACK | no Tx |
| unknown | X | X | X | X | X | X | 0 | | | | | | no[d] |
| empty | X | no | >0 | no | X | X | 1/(est_num + 1) | no | no | no | no | no | no |
| " | X | no | >0 | yes | X | X | 1/(est_num + 1) | res | no | res | no | no | no |
| " | X | yes | >0 | no | no | X | 1/(est_num + 1) | no | no | no | no | own | no |
| " | X | yes | >0 | no | yes | X | 1 | no | no | no | no | own | |
| " | X | yes | >0 | yes | yes | X | 1 | own | no | own | no | own | |
| reserved | no | yes | >0 | no | yes | X | 1 | no | no | no | no | own | |
| " | no | yes | >0 | yes | yes | X | 1 | own | no | own | no | own | |
| " | yes | no | >0 | no | X | X | 1 | no | yes | no | no | no | |
| " | yes | no | >0 | yes | X | no | 1 | res | yes | res | no | no | |
| " | yes | no | >0 | yes | X | yes | 1 | no | yes | no | no | no | |
| owner | X | yes | >0 | no | X | X | 1 | no | no | no | no | own | |
| " | X | yes | >0 | yes | X | X | 1 | own | no | own | no | own | |
| all other cases | | | | | | | | | | | | | no | where [d] = in addition a down link slot error should be counted,
X = don't care In Table 5, the 'Current state' columns give the state following receipt of a down-link data unit. The 'Transmission decision' columns indicate whether the mobile station should transmit, what flow requests should be made and consequent action. The 'Tx Probability' specifies the probability that the mobile station will transmit. In three cases the transmission probability is determined from the hub station's estimate of the number of mobiles contending for ALOHA access. To compress the table, the Flow Record Update' columns are separated according to whether a transmission was made (first 3 columns) or not (4th column). The first 3 columns specify how the mobile station should update its flow record for each of three possible acknowledgment responses in the next down-link data unit. The action here modifies the flow status of the channel just used. Entry 'no' means that there is no owner or reserve flow and 'res' or 'own' means that 'reserve flow' or 'owner flow' respectively is recorded.

Table 5 also specifies that the mobile station should count errored data units, indicated in the table by 'channel state'= 'unknown'. This number can be used to decide when the link has become unreliable and remedial action needs to be taken, ie. a return from 'data' state 52 to the 'registration' state 51 shown in FIG. 11a.

Also, whenever a mobile transmits it sets its contend-rq field according to Table 6 to assist the hub station in its determination of the number of mobiles contending for empty slots.

TABLE 6

Mobile station Contend-Rq Generation

| Queue length | Contend-Rq |
|---|---|
| >1 | yes |
| ≦1 | no |

Owner Flow Requests

An owner-flow request is a flow request made by a mobile station for a channel that it owns. On receipt of an owner flow request the hub station changes the channel state to owner, meaning only the owner of the channel is allowed access to the channel. This facility allows the owner of a channel to dynamically create a contention free TDMA-like channel for its own use. Even if the hub station does not receive the slot containing the owner-flow request correctly, due to a collision or other error, the request is still successful because the hub station assumes that the owner of the channel has caused the collision to regain access to the channel. This state will not persist unnecessarily as the owner must request retention of owner-state in successive slots.

An owner-flow request must receive a positive acknowledgment with the owner ack-id to be considered successful. A mobile station that makes an owner-flow request marks the channel as an owner flow and increments "Flows", a counter in each mobile station that represents the total number of flows that the mobile station currently holds. Similarly, the end of a flow must result in "Flows" being decremented.

A mobile station will make an owner-flow request for a channel only if the data in its queue cannot be transmitted in the flows that the mobile station has already been granted.

Reserve Flow Requests:

A reserve-flow request is a flow request made by a, mobile station for any channel that it does not own. If the slot containing a reserve-flow request is correctly received by the hub station, it changes the channel state to reserved-state.

If the slot containing the reserve-flow request is not correctly received by the hub station it is assumed that the owner of the channel has caused a collision in order to regain access to the channel. The hub station changes the channel state to owner-state, which is the same action as for incorrectly received slots containing an owner-flow request.

A mobile station making a reserve-flow request must wait for an explicit acknowledgment, with the ack-id matching the station-id (to avoid the "capture" problem) that the request was received correctly by the hub station before marking the channel as a reserve-flow and incrementing "Flows". The acknowledgment to the reverse-flow request is controlled in the header of the next down-link slot.

A mobile station should make a reserve-flow request for a channel only if the data in its queue cannot be transmitted in the flows that the mobile station has already been granted. Specifically, there must be potential to transmit all data using just one access to each of the granted flows.

After a mobile station receives a down-link data unit it must use its current state, shown in the Current State columns of Table 5 and Table 6, to decide whether and how it is going to transmit a data unit in the next up-link slot. The mobile station's Current State consists of:

"Channel State"—the state of the channel determined by the hub station.

"Mobile has flow in chan"—indicates if a reserve-flow or owner-flow is recorded for the channel.

"Owner"—indicates that the Mobile station owns the channel.

"Queue Length"—the number of data unit payloads in the Mobile station's queue.

FlowRequestAllowed=(QueueLength>Flows+1).
Pre-emptAllowed=(Queue Length>Flows).
ReleaseRequired=(FlowCounter=0).

Given a particular current state, the appropriate action is shown in the transmission decision columns in Table 5. If the "Tx Probability" is one, the mobile station always transmits. If the "Tx Probability" is zero, then the mobile station must not transmit a data unit. If a data unit is transmitted then the "request reserve-flow" and "request owner-flow" columns indicate whether a "reserve-flow request" or an "owner-flow request" respectively should be made.

A parameter, "FlowMax" is defined and a counter "FlowCounter" is required in each mobile station. Every time a mobile station transmits a data unit in a reserve-flow, the mobile station increments "FlowCounter" modulus "FlowMax". The value of "FlowMax" is a configurable parameter. If "FlowCounter" equals zero when a mobile station is about to transmit a data unit in a reserved-flow, the mobile station must not request continuation of the reserved-flow irrespective of the state of its queue or the number of other flows it currently holds. A mobile station never has to release an owner-flow because they are not considered to be part of the sharing process.

In general terms, low values for FlowMax are always unsatisfactory as they limit throughput, while large values give good throughput but poor delay. A broad range of intermediate values can provide good performance.

The "increment FlowCounter" column of Table 5 indicates whether "FlowCounter" should be incremented modulus "FlowMax".

The transmission result block in Table 5 shows the action that is taken after reception of the next down-link slot that may contain an acknowledgment of any data unit transmitted.

Mobile Sleeping

A battery powered mobile station may wish to remove power from some parts of its electronic circuitry whenever its operation is not required, and thus can enter the 'data-sleep' state 58 shown in FIG. 11c. This is supported by the Hub station's scheduling process.

Performance Data

Negotiated access by stations can be scheduled without contention and with delays agreed upon. The remaining traffic involves contended access to the network, including traffic subject to statistical multiplexing. This contended traffic has been the subject of simulation.

Two independent methods were used to perform the simulation. The result shown here were derived from a software implementation of the protocol using the C programming language. In this simulation the hub and mobile stations, were each implemented as a thread, where all communications among them were restricted to information in the packet exchanges illustrated in FIGS. 11. The traffic used in the simulations was generated using Poission statistics. The base simulation unit was a time-slot, instead of absolute time in seconds, as a result the performance illustrated is valid for arbitrary slot sizes.

These simulation results were verified using a commercial simulation package called OPNET, supplied by MIL 3, Inc, 3400 International Drive, Washington D.C. 20008.

FIGS. 12–15 variously have as an indices 'Offered Load' vs 'Throughput', where a value of 1 indicates the whole part of the bandwidth available for non-guaranteed traffic and 'Delay' vs 'Throughput'. The channel may have scheduling, agreements for, say, 90% of its capacity, with the remaining 10% being subject to contention.

Figure 12:
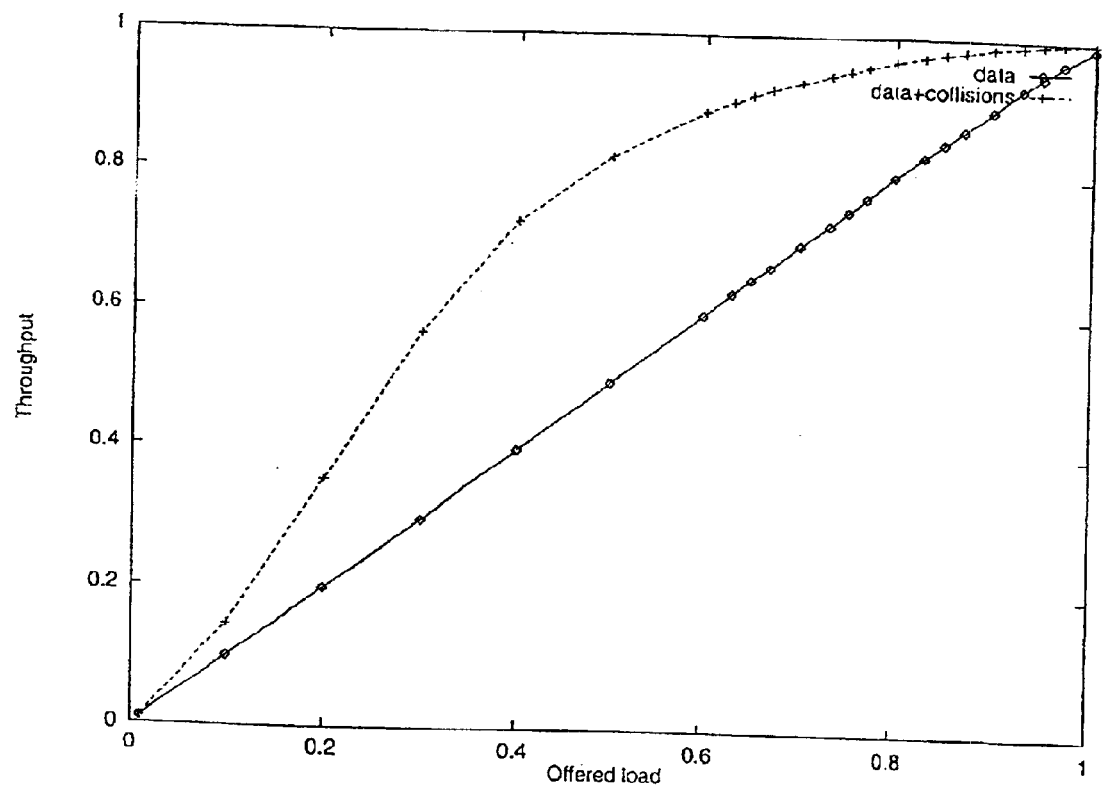
FIGS. 12 to 15 show graphs of throughput and delay for simulated contention situations.
Figure 13:
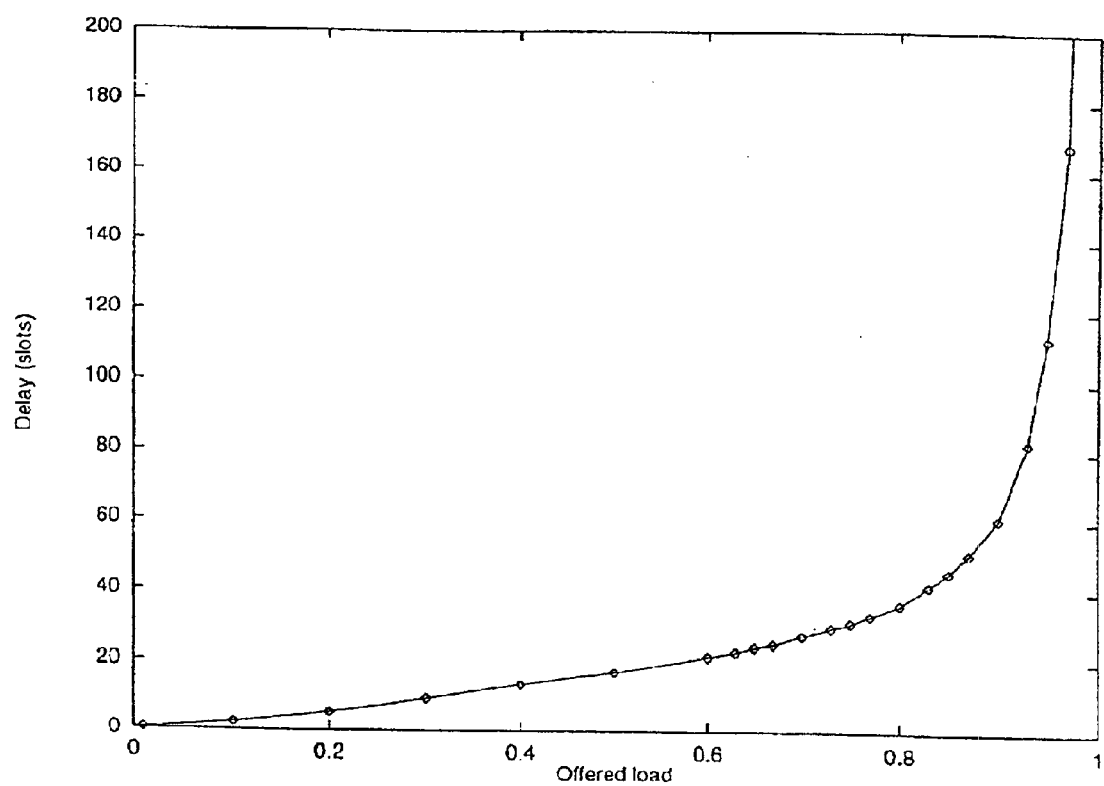

FIGS. 12 and 13 show the situation of ten mobile stations competing with equal probability for network access. The hub does round-robin scheduling of the ten slots owned by the stations.

The throughput plot shows that the protocol is converting the Offered Load directly to throughput over almost the entire range. Also shown on FIG. 12 is additional protocol-related traffic required to obtain competitive access. This region between "data" and "data+ collision" shows increasing activity as the probability of slotted ALOHA type collisions increases as load increases, then a progressive reduction as the protocol's behaviour becomes more TDMA like. The delay remains better than that achieved in pure TDMA, conventionally taken to be 1+(no. slots /2), in this case 6 slots, until the offered load reaches 0.3. Then it increases as collisions cause delayed access. However this still stays quite low until the offered load approaches 0.9. At this point mean delay grows rapidly because a TDMA mode of operation is not uniformly established and where collision is still being used to obtain access queue length (hence delay) will increase.

Figure 14:
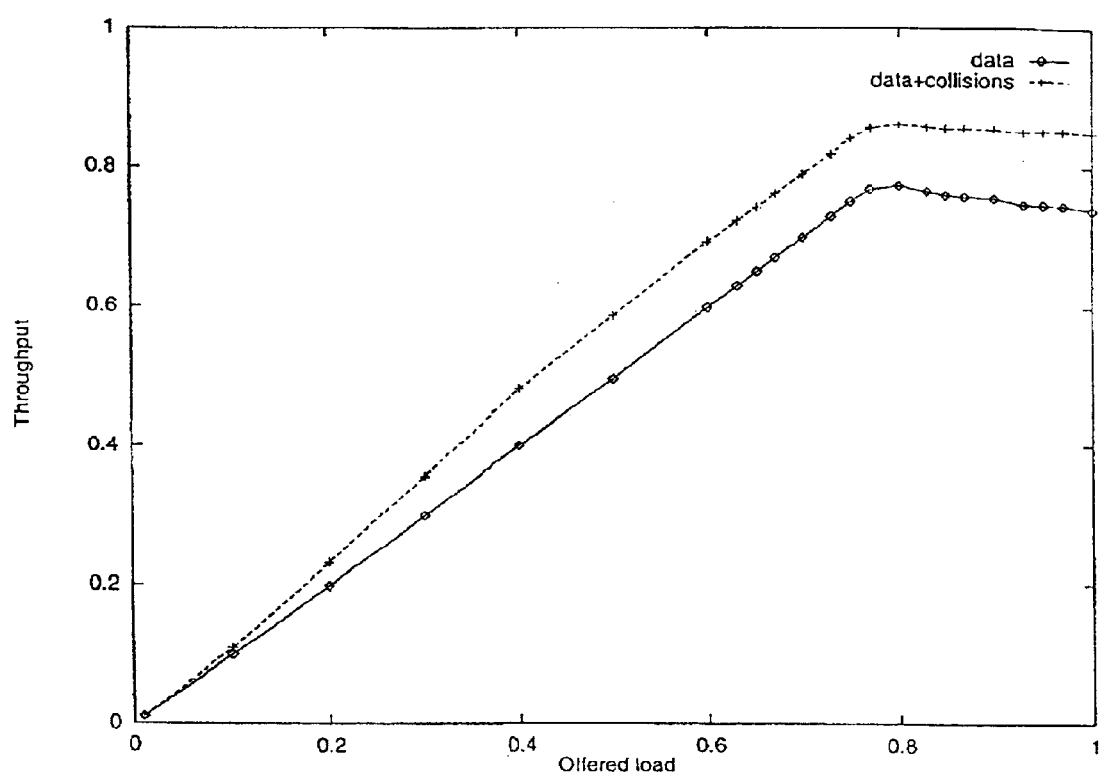
Figure 15:
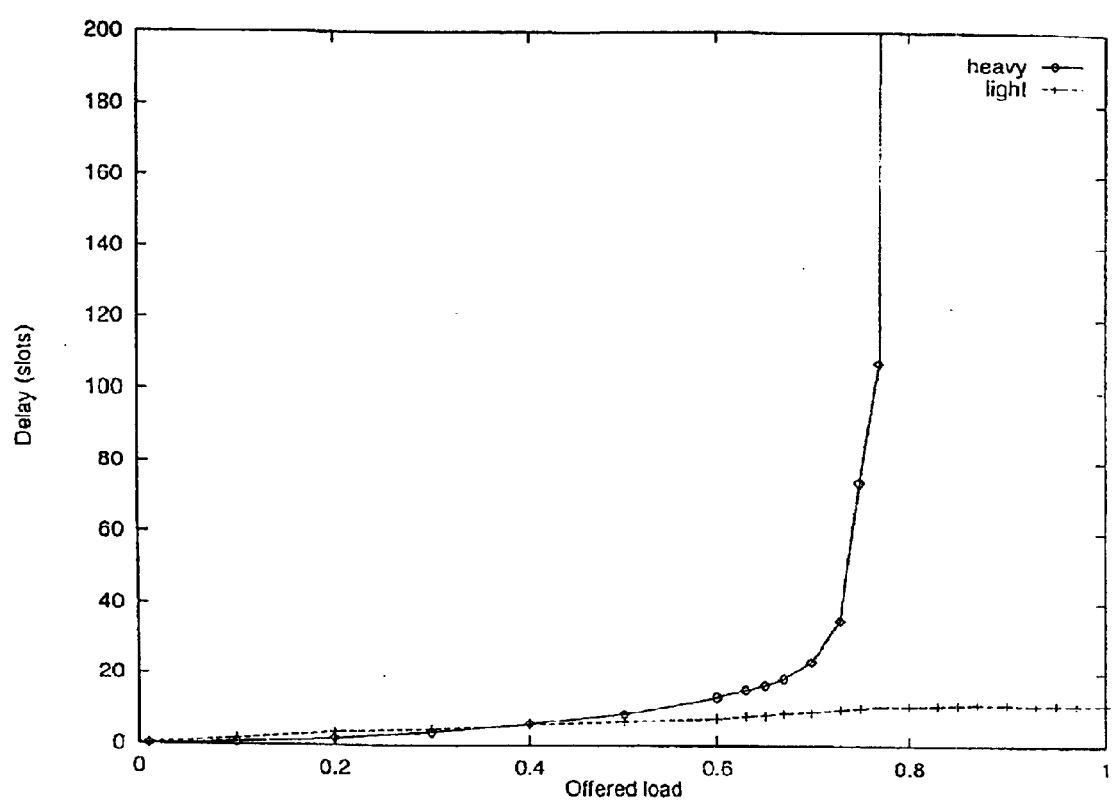

FIGS. 14 and 15 relate to a simulation where there are again ten stations being offered their owner slots on a round-robin basis.

However, one station (causing "heavy" traffic) is generating 90% of the system's Offered Load while the other nine stations (causing "light" traffic) evenly share the remaining 10% of the Offered Load. Note that there are no traffic agreements here. The Offered Loads are still for the contended pan of the system bandwidth only.

The system Throughput directly matches the Offered Load up to an Offered Load of around near 0.8. The "heavy" traffic station will attempt to use all the slots it requires while "light" traffic stations will increasingly need to collide to temporarily reserve their owned slots to deliver a packet. The region representing collisions shows this behaviour. As the system load becomes high, the "light" station will need to use nearer and nearer to 10% of the channel. To obtain this they will consume an increasing part of the bandwidth in collisions. So, after reaching a peak, throughput will decline as collisions become more likely. As the decision to transmit is probabilistic, even the (data+collision Throughput) cannot reach 1.

At the same time, the "heavy" station will have increasing difficulty emptying its queue and its delay increases sharply. On the other hand, the "light" stations can regain their owned channel and dispatch their packets before another arrives. FIGS. 13 and 15 show very good Delay performance.

This demonstrates excellent fairness, in that the heavy user did not prevent stations with modest requirements from using the network.

Embodiments of the invention provide advantages (or avoid disadvantages) over the prior art MAC hybrid protocols discussed earlier. In relation to R-ALOHA the present MAC protocol attempts to reserve multiple slots depending on how many data units have been buffered. However, it does not retain reserved slots beyond its immediate need to use them or beyond the specified consecutive number of accesses. Also, in comparison with R-ALOHA there is an improvement in performance by stations owning channels which can be preempted on demand, where the demand includes collision of transmission, and also by structuring up-link and down-link slots so as to provide immediate feedback to a previous transmission attempt. In relation to the PRMA protocol, the present protocol, in contrast, does not distinguish between "voice" and "other" traffic, in which case there is no reliance on characteristics of voice traffic, such as freedom to discard data units, or relatively fixed frame rates. The technique of obtaining access to reserved slots has been enhanced by the concept of "owner channel" which may be rapidly forced into a reserved-state rather than waiting for an ALOHA access to succeed.

Turning now to the ALTAIR™ system, for the present protocol control information is distributed in time and each slot access is controlled by the previous slot header and acknowledged by the following slot header. Failure to read one of the control messages will result in the loss of only one slot access, which is a small impact. Further, the present protocol uses a number of schemes to generate access, including the guaranteed reservation, thereby obviating the need for complex feedback. Finally, the present protocol allows mobile stations to respond directly to hub station messages, in that there is no requirement to determine when a granted slot number occurs. There also is no requirement for accurate timing by the mobile stations. Rather, only the hub station's timing is important to avoid unwanted unused time.

Turning now to the IBM protocol, the same observations over and above in relation to ALTAIR™ apply, together with the added advantage that the present protocol is less complex as there is a less involved overall structure and powering down is directed by the hub station.

Turning finally to the DFWMAC protocol, in comnparison, the present protocol has the ability to respond to bursty traffic and to make efficient use of the available medium. Furthermore, the protocol is able to specify when a mobile station may sleep because of the defined centralised control, which otherwise is more difficult to achieve in a distributed control system.

While the wireless LAN and wired network embodiments have been described, the invention has numerous other applications, including the following.

The MAC protocol can be used to control the resources in a wireless LAN where a number of computers, some of which may be mobile, are connected to each other and/or a wired backbone LAN. The MAC protocol could also be used to control access to a wireless access point for an ATM network, commonly referred to as wireless ATM. This could be for the access of mobile of fixed computer terminals to an ATM network or for connecting together physically separated ATM networks.

Another area of application is the delivery of entertainment services, Internet and telephony services to the home or office. This could be using coaxial cable systems, hybrid fibre coaxial cable systems, hybrid fiber-radio systems or fiber to the kerb followed by radio or Copper wire-based access to the home or office. In these applications, the MAC protocol is used to control access to and from a home/office, but particularly on the so-called back channel (transmission from the home/office to the head-end) where a number of users share the same bandwidth for data and/or telephony. The MAC protocol can have further applications in radio based personal communications systems where both voice and data traffic is generated by mobile handsets or terminals. The MAC protocol can have further applications in point to multi-point radio communications systems where a number of stations are communicating to a central station which may be connected to a communications network. Such systems may be used in wireless back-hand for mobile communications networks such as trunked radio or Group Speciale Mobile (GSM).

A yet further application is for wireless systems in homes or offices for the distribution of entertainment services and data between a set-top box provided by a service provider to a number of televisions, and/or computers and associated peripherals. it is possible to extend the MAC protocol to include the establishment of peer to peer networks. These are networks where there is no controlling hub station, but a collection of mobile terminals which wish to communicate amongst themselves. These extension enable communications to occur. Alternatively, it may be possible to have a mobile terminal(s) with hardware and software to enable it to operate as a hub station using this MAC protocol.

What is claimed is:

1. A method for controlling communications access between a hub and a plurality of distributed stations over a medium, the method comprising the steps of:
   (a) the hub allocating a plurality of channels, for data communications between the stations and the hub, the number of channels being at least equal to the number of stations, and each station owning at least one channel, and wherein each channel is varyingly in a distinct one of an empty-, a reserved-, or an owner-state, and wherein:
      (i) the empty-state provides a channel to which any station can have access;
      (ii) the reserved-state provides a channel having an owner and to which a station having made a reservation with the hub, but not owning the channel, can have access if not being used by the owner, and further to which the owner can resume access on demand; and
      (iii) the owner-state provides a channel to which only the owning station has access; and
   (b) the hub re-allocating the respective state and/or the number of channels over time on the basis of each station's data requirements.

2. A method as claimed in claim 1, wherein the data communication is over a medium having finite bandwidth.

3. A method as claimed in claim 1, wherein there are at least as many channels in the owner-state as there are stations.

4. A method as claimed in claim 1, comprising the further step of a station at any time requesting of the hub to be allocated one or more extra channels.

5. A method as claimed in claim 1, whereby a channel further provides for management traffic between each station and the hub, and comprises the further step, as management traffic, of a station negotiating with the hub to be allocated a required number of channels in the owner-state.

6. A method as claimed in claim 5, comprising the further step of a station negotiating with the hub to be allocated a required number of channels in the reserved-state.

7. A method as claimed in claim 5, comprising the further steps of a station requesting an indication of the number of stations seeking to register, and the hub responding thereto, wherein said station receives said indication by request and indication.

8. A method as claimed in claim 5, comprising the further steps of a station requesting an indication of the number of stations seeking to register, and the hub responding thereto, wherein said station receives said indication by broadcast.

9. A method as claimed in claim 5, comprising the further steps of a station requesting an indication of the number of stations seeking to use a channel and the hub responding thereto, whereby said station receives said indication by request and indication.

10. A method as claimed in claim 5, comprising the further steps of a station requesting an indication of the number of stations seeking to use a channel and the hub responding thereto, whereby said station receives said indication by broadcast.

11. A method as claimed in claim 5, comprising the further step of a station requesting the hub to be deregistered to give-up allocated channels.

12. A method as claimed in claim 5, comprising the further step of a station requesting the hub to delay any data communication to the station for a period of time to be in a sleep mode.

13. A method as claimed in claim 1, wherein the step of re-allocation includes temporarily ascribing use of reserved-state channel to a non-owning station.

14. A method as claimed in claim 13, whereby said temporary use is rescinded following lapse of a time period of no use by the ascribed station.

15. A method as claimed in claim 1, wherein each said channel has a plurality of uplink and downlink slots, and comprising the further step of the number of slots within a channel being variable to account for each station's data requirements.

16. A method for controlling communications access between a hub and a plurality of mobile stations via a plurality of channels providing data access therebetween, there being at least as many channels as mobile stations, and the channels is varyingly in a distinct one of an empty-, a reserved-, or an owner-state, and wherein:
   (i) the empty-state provides a channel to which any station can have access;
   (ii) the reserved-state provides a channel having an owner and to which a station having made a reservation with the hub, but not owning the channel, can have access if not being used by the owner, and further to which the owner can resume access on demand; and
   (iii) the owner-state provides a channel to which only the owning station has access;
   the method comprising the steps of the hub re-allocating the respective state and/or the number of channels over time on the basis of each station's data requirements.

17. A method as claimed in claim 16, wherein the data communication is over a medium having finite bandwidth.

18. A method as claimed in claim 16, whereby a channel further provides for management traffic between each station and the hub, and comprises the further step, as management traffic, of a station negotiating with the hub to be allocated a required number of channels in the owner-state.

19. A method as claimed in claim 16, wherein the medium is free space.

20. A method as claimed in claim 16, comprising the further step of a station negotiating with the hub to be allocated a required number of channels in the reserved state.

21. A method as claimed in claim 16, comprising the further steps of a station requesting an indication of the number of stations seeking to register, and the hub responding thereto, wherein said station receives said indication by request and indication.

22. A method as claimed in claim 16, comprising the further steps of a station requesting an indication of the number of stations seeking to register, and the hub responding thereto, wherein said station receives said indication by broadcast.

23. A method as claimed in claim. 16, comprising the further steps of a station requesting an indication of the number of stations seeking to use a channel, and the hub responding thereto, wherein said station receives said indication by request and indication.

24. A method as claimed in claim 16, comprising the further steps of a station requesting an indication of the number of stations seeking to use a channel, and the hub responding thereto, wherein said station receives said indication by broadcast.

25. A method as claimed in claim 16, comprising the further step of a station requesting the hub to be deregistered to give-up allocated channels.

26. A method as claimed in claim 16, comprising the further step of a station requesting the hub to delay any data communications to the station for a period of time to be in a step mode.

27. A method as claimed in claim 16, whereby the step of reallocation includes the step of temporarily ascribing use of reserved-state channel to a non-owning station.

28. A method as claimed in claim 27, whereby said temporary use is rescinded following lapse of a time period of no use by the ascribed station.

29. A method as claimed in claim 16, wherein each said channel has a plurality of uplink and downlink slots, and comprising the further step of the the hub varying the number of slots within a channel to account for each station's data requirements.

30. A communications system having controlled data access to a medium, the system comprising:
   a hub having transceiving means for communication via the medium and data processing means;
   a plurality of distributed stations, each having transceiving means for communication with the hub via the medium and data processing means;
   and wherein said data processing means of the hub allocates a plurality of channels for data communications between the stations and the hub, the number of channels being at least equal to the number of stations, and each station owning at least one channel, and wherein each channel is varyingly in a distinct one of an empty-, a reserved-, or an owner-state, and wherein:
   (i) the empty-state provides a channel to which any station can have access,
   (ii) the reserved-state provides a channel having an owner and to which a station having made a reservation with the hub, but not owning the channel, can have access if not being used by the owner, and further to which the owner can resume access on demand, and
   (iii) the owner-state provides a channel to which only the owning station has access,
   and co-operate to re-allocate the respective state and/or the number of channels over time on the basis of each station's data requirements.

31. A system as claimed in claim 30, wherein the stations are mobile and the medium is free space.

32. A system as claimed in claim 30, wherein the data communications is over a medium having finite bandwidth.

33. A system as claimed in claim 30, wherein there are at least as many channels in the owner-state as there are stations.

34. A system as claimed in claim 30, wherein a station data processing means, at any time, requests from the hub data processing means to be allocated one or more extra channels.

35. A system as claimed in claim 30, wherein the hub data processing means further provides for management traffic between each station and the hub, and the management traffic includes a station negotiating with the hub to be allocated a required number of channels in the owner-state.

36. A system as claimed in claim 35, wherein a station data processing means negotiates with the hub data processing means to be allocated a required number of channels in the reserved-state.

37. A system as claimed in claim 35, wherein a station data processing means requests an indication of the number of stations seeking to register, and the hub data processing means responds thereto, and wherein said station receives said indication by request and indication.

38. A system as claimed in claim 35, wherein a station data processing means requests an indication of the number of stations seeking to register, and the hub data processing means responds thereto, and wherein said station receives said indication by broadcast.

39. A system as claimed in claim 35, wherein a station data processing means requests an indication of the number of stations seeking to use a channel and the hub responding thereto, and wherein said station receives said indication by request and indication.

40. A system as claimed in claim 35, wherein a station data processing means requests an indication of the number of stations seeking to use a channel and the hub responding thereto, and wherein said station receives said indication by broadcast.

41. A system as claimed in claim 35, wherein a station data processing means requests the hub data processing means to be deregistered to give-up allocated channels.

42. A system as claimed in claim 35, wherein a station data processing means requests the hub data processing means to delay any data communication to the station for a period of time to be in a sleep mode.

43. A system as claimed in claim 30, wherein re-allocation includes temporarily ascribing use of reserved-state channel to a non-owning station.

44. A system as claimed in claim 43, wherein said temporary use is rescinded following lapse of a time period of no use by the ascribed station.

45. A system as claimed in claim 30, wherein each said channel has a plurality of uplink and downlink slots, and wherein the hub varies the number of slots within a channel to account for each station's data requirements.

46. A hub for a communications system, operable to have controlled data access to a medium in co-operation with a plurality of distributed, stations, the hub comprising:
   transceiving means for communications via the medium; and
   data processing means coupled to the transceiving means;
   and wherein said data processing means of the hub is operable to allocate a plurality of channels for data traffic between the stations and the hub, the number of channels being at least equal to the number of stations, and wherein each channel is varyingly in a distinct one of an empty-, a reserved-, or an owner-state, and wherein:
   (i) the empty-state provides a channel to which any station can have access,
   (ii) the reserved-state provides a channel having an owner and to which a station having made a reservation with the hub, but not owning the channel, can have access if not being used by the owner, and further to which the owner can resume access on demand, and
   (iii) the owner-state provides a channel to which only the owning station has access,
   and further operable to re-allocate the respective state and/or the number of channels over time on the basis of each station's data requirements.

47. A hub as claimed in claim 46, wherein the stations are mobile and the medium is free space.

48. A hub as claimed in claim 46, wherein the data communications is over a medium having finite bandwidth.

49. A hub as claimed in claim 46, wherein there are at least as many channels in the owner state as there are stations.

50. A hub as claimed in claim 46, wherein a station data processing means, at any time, requires from the hub data processing means to be allocated one or more extra channels.

51. A hub as claimed in claim 46, wherein the hub data processing means further provides for management traffic between each station and the hub, and the management traffic includes a station negotiating with the hub to be allocated a required number of channels in the owner-state.

52. A hub as claimed in claim 51, wherein a station data processing means requests an indication of the number of stations seeking to register, and the hub data processing means responds thereto, and wherein said station receives said indication by request and indication.

53. A hub as claimed in claim 51, wherein a station data processing means requests an indication of the number of stations seeking to register, and the hub data processing means responds thereto and wherein said station receives said indication by broadcast.

54. A hub as claimed in claim 51, wherein a station data processing means requests an indication of the number of stations seeking to use a channel, and the hub responding thereto, and wherein said station receives said indication by request and indication.

55. A hub as claimed in claim 51, wherein a station data processing means requests an indication of the number of stations seeking to use a channel, and the hub responding thereto, and wherein said station receives said indication by broadcast.

56. A hub as claimed in claim 51, wherein a station data processing means requests the hub data processing means to be deregistered to give up allocated channels.

57. A hub as claimed in claim 51, wherein a station data processing means requires the hub data processing means to delay any data communication to the station for a period of time to be in a sleep mode.

58. A hub as claimed in claim 46, wherein a station processing means negotiates with the hub data processing means to be allocated a required number of channels in the reserved-state.

59. A hub as claimed in claim 46, wherein re-allocation includes a temporarily ascribing use of reserved-state channel to a non-owning station.

60. A hub as claimed in claim 59, wherein said temporary use is rescinded following lapse of a time period of no use by the ascribed station.

61. A hub as claimed in claim 46, wherein each said channel has a plurality of uplink and downlink slots, and wherein said data processing means varies the number of slots within a channel to account for each station's data requirements.

62. A wireless local area network having a medium access protocol to control access, the network comprising:

a hub having transceiving means for communication via free space paths and data processing means;

a plurality of distributed stations, each having transceiving means for communication with the hub via free space paths and data processing means;

and wherein said data processing means of the hub allocates a plurality of channels for data traffic between the stations and the hub, the number of channels being at least equal to the number of stations, and each station owning at least one channel, and wherein each channel is varyingly in a distinct one of an empty-, a reserved-, or an owner-state, and wherein:

(i) the empty-state provides a- channel to which any station can have access, (ii) the reserved-state provides a channel having an owner and to which a station having made a reservation with the hub, but not owning the channel, can have access if not being used by the owner, and further to which the owner can resume access on demand, and (iii) the owner-state provides a channel to which only the owning station has access, and the hub re-allocates the respective state and/or the number of channels over time on the basis of each station's data requirements.

63. A wireless local area network as claimed in claim 62, wherein the stations are mobile and the medium is free space.

64. A wireless local area network as claimed in claim 62, wherein the data communications is over a medium having finite bandwidth.

65. A wireless local area network as claimed in claim 62, wherein there are at least as many channels in the owner state as there are stations.

66. A wireless local area network as claimed in claim 62, wherein a station data processing means, at any time, requires from the hub data processing means to be allocated one or more extra channels.

67. A wireless local area network as claimed in claim 62, wherein the hub data processing means further provides for management traffic between each station and the hub, and the management traffic includes a station negotiating with the hub to be allocated a required number of channels in the owner-state.

68. A wireless local area network as claimed in claim 67, wherein a station data processing means requests an indication of the number of stations seeking to register, and the hub data processing means responds thereto, and wherein said station receives said indication by request and indication.

69. A wireless local area network as claimed in claim 67, wherein a station data processing means requests an indication of the number of stations seeking to register, and the hub data processing means responds thereto, and wherein said station receives said indication by broadcast.

70. A wireless local area network as claimed in claim 67, wherein a station data processing means requests an indication of the number of stations seeking to use a channel, and the hub responding thereto, and wherein said station receives said indication by request and indication.

71. A wireless local area network as claimed in claim 67, wherein a station data processing means requests an indication of the number of stations seeking to use a channel, and the hub responding thereto, and wherein said station receives said indication by broadcast.

72. A wireless local area network as claimed in claim 67, wherein a station data processing means requests the hub data processing means to be deregistered to give up allocated channels.

73. A wireless local area network as claimed in claim 67, wherein a station data processing means requires the hub data processing means to delay any data communication to the station for a period of time to be in a sleep mode.

74. A wireless local area network as claimed in claim 67, wherein re-allocation includes a temporarily ascribing use of reserved-state channel to a non-owning station.

75. A wireless local area network as claimed in claim 74, wherein said temporary use is rescinded following laps of a time period of no use by the ascribed station.

76. A wireless local area network as claimed in claim 62, wherein a station processing means negotiates with the hub data processing means to be allocated a required number of channels in the reserved-state.

77. A wireless local area network as claimed in claim 62, wherein each said channel has a plurality of uplink and downlink slots, and wherein the hub varies the number of slots within a channel to account for each station's data requirements.

78. A method for communications access between a hub and a plurality of distributed stations over a medium, comprising providing a plurality of channels for data communications between the stations and the hub, wherein each channel is varyingly in a distinct one of an empty-, a reserved-, or an owner-state, and wherein:
  (i) the empty-state provides a channel to which any station can have access;
  (ii) the reserved-state provides a channel having an owner and to which a station having made a reservation with the hub, but not owning the channel, can have access if not being used by the owner, and further to which the owner can resume access on demand; and
  (iii) the owner-state provides a channel to which only the owning station has access.

79. The method of claim 78, wherein the number of channels is variable but at least equal to the number of stations.

80. A method for controlling communications access between a hub and a plurality of distributed stations over a medium supporting a plurality of channels for data communications between the stations and the hub, the number of channels being at least equal to the number of stations, and each station owning at least one channel, comprising: the hub dynamically allocating the number of channels and the respective state, and wherein each channel is varyingly in a distinct one of an empty-, a reserved-, or an owner-state, and wherein:
  (i) the empty-state provides a channel to which any station can have access;
  (ii) the reserved-state provides a channel having an owner and to which a station having made a reservation with the hub, but not owning the channel, can have access if not being used by the owner, and further to which the owner can resume access on demand; and
  (iii) the owner-state provides a channel to which only the owning station has access.

81. A hub for a communications system, operable to have controlled data access to a medium in co-operation with a plurality of distributed stations, the hub comprising:
  transceiving means for communications via the medium; and
  data processing means coupled to the transceiving means, and operable to dynamically allocate a plurality of channels for data traffic between the stations and the hub, the number of channels being at least equal to the number of stations, and each channel being varyingly in a distinct one of an empty-, a reserved-, or an owner-state, and wherein:
  (i) the empty-state provides a channel to which any station can have access,
  (ii) the reserved-state provides a channel having an owner and to which a station having made a reservation with the hub, but not owning the channel, can have access if not being used by the owner, and further to which the owner can resume access on demand, and
  (iii) the owner-state provides a channel to which only the owning station has access.

* * * * *